Dec. 10, 1957  C. L. QUACKENBUSH  2,815,606
FLOWER SUPPORT
Filed Dec. 6, 1954
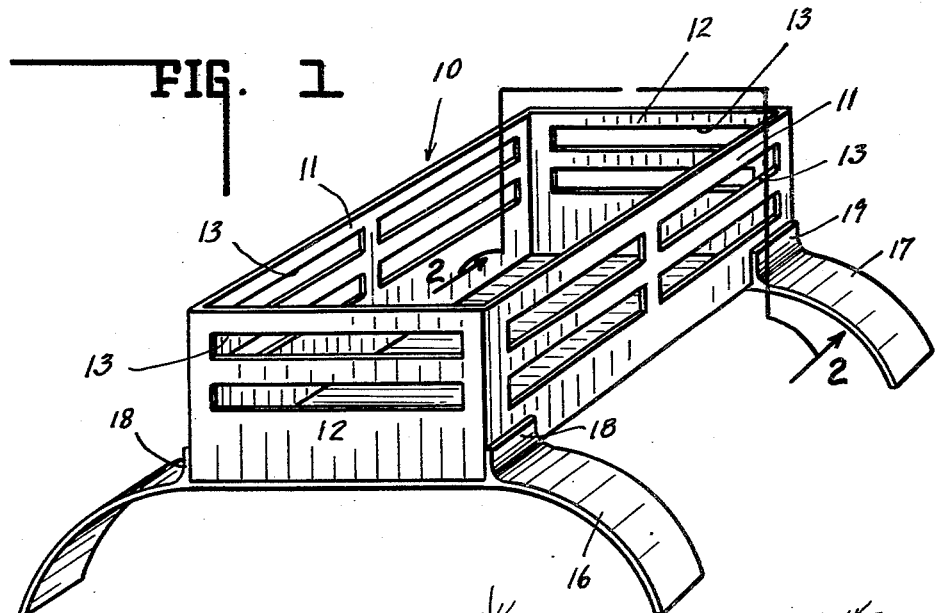
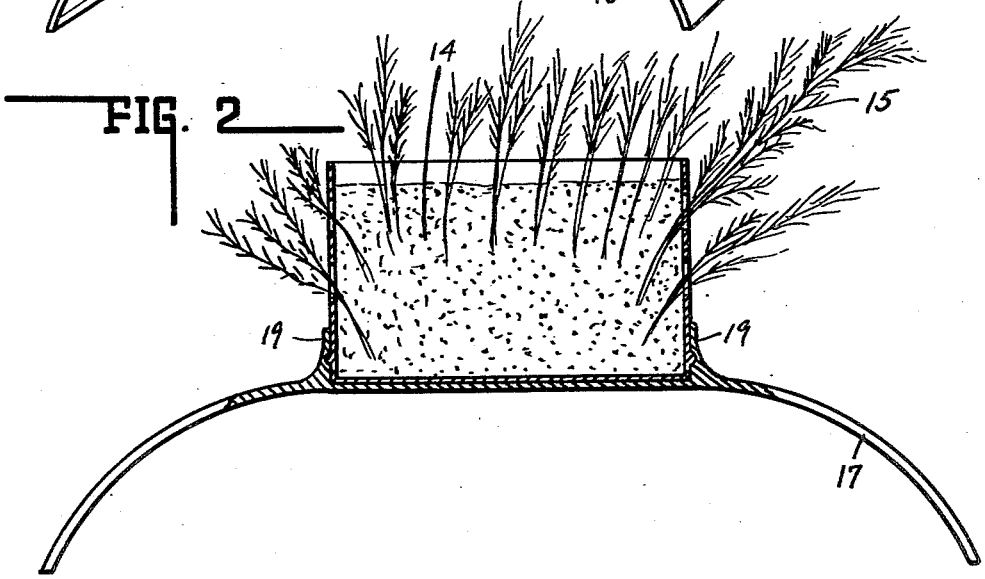
INVENTOR.
CARL L. QUACKENBUSH.
BY
Lockwood, Galt, Woodard + Smith
ATTORNEYS.

2,815,606
FLOWER SUPPORT

Carl L. Quackenbush, Indianapolis, Ind.

Application December 6, 1954, Serial No. 473,283

1 Claim. (Cl. 47—41)

This invention relates to a flower holder, and more particularly to one designed for use as a funeral display.

It is the primary object of this invention to provide means for supporting flowers in such a position as to create the desired decorative effects. Heretofore, with conventional holders, it has been necessary to thrust the stems of the flowers, ferns or the like through the open top of the structure and then bend the stems so that they fall gracefully over the sides and ends thereof. The bending, however, has a bad effect on the flowers and is to be avoided if their life is to be extended. With the present invention it becomes unnecessary to bend the flowers, yet they can be arranged even more gracefully and naturally than before.

It is a further object of this invention to provide a holder which is readily detached from its supporting legs when desired, and which is reassembled with ease when the flowers have been arranged in the holder.

It is a still further object of this invention to provide means of such character and arrangement that stems of flowers may be inserted and arranged therein with ease, and when necessary or desirable during the preparation of the display, removed and then reinserted and rearranged with equal ease.

It is a still further object of the present invention to provide a flower holder which is adapted to receive a moisture retaining medium, the holder being so formed as to provide multiple insertion points for the stems of flowers which are thus not only adequately supported but as well properly supplied with water.

A still further object of this invention is to provide a holder which is simple, lightweight and inexpensive to manufacture.

The full nature of the invention will be understood from the accompanying drawings and the following description and claim.

In the drawings—Fig. 1 is a perspective view of the invention.

Fig. 2 is a vertical section view taken on lines 2—2 of Fig. 1 in the direction of the arrows with flowers being shown supported by a moisture retaining medium within the holder.

In the drawings a substantially rectangular box-like structure is shown generally at 10. This may be formed of transparent plastic or of any other suitable material. In the side and end walls 11 and 12 respectively of this structure are formed a plurality of elongated openings 13.

Within the holder thus formed is disposed a moisture retaining medium 14 such as that known by the trademark Snow-Pak. This medium is of such character that the stems of flowers 15 may easily be embedded therewithin as shown in Fig. 2. The stems may either be extended through the various openings and/or through the top of the holder into the medium where they will be adequately supported and retained. Thus the flowers will be permitted to fall naturally over the sides and ends of the holder in a manner that is decorative and attractive to the eye. By reason of this construction and arrangement it is unnecessary to bend the stems in order to make the flowers fall or "drape" over the sides and ends. The life of the flowers is thereby indefinitely extended since there will be no damage to the stems.

The holder is readily detached from or connected to the substantially U-shaped supporting legs 16 and 17. The two sets of legs each has a flat intermediate portion for supporting the bottom of the container (see Fig. 2) and a pair of spaced and opposed clamps or uprights 18 and 19 formed at opposite ends of said flat portion. The legs and clamps will preferably be formed of plastic or other flexible material. In order to remove the holder from clamping engagement between the opposed pairs of clamps it is necessary only that the arcuate portions (see Fig. 2) of the legs be flexed to increase the distance between the opposed clamping members. Once this is done the holder may be removed with ease, or if it is being assembled it may be disposed between the clamps with ease. After the user releases his flexing grip the legs and clamping members return to their original position with the latter in firm engagement with the sides of the holder. It is apparent that the opposed clamps will have to be spaced apart a distance approximating the width of the holder, and that the flat portion and the uprights or upstanding elements together define a socket for clampingly receiving any given part of the bottom of the container.

While the invention has been illustrated and described in the drawings and foregoing description, the same is to be considered as illustrative and not restrictive in character, it being understood that only the preferred embodiment has been shown and described and that all changes and modifications that come within the spirit of the invention and the scope of the claim are also desired to be protected.

The invention claimed is:

A flower holder comprising a substantially rectangular container adapted to receive a medium for the embedding therewithin of the stems of flowers, said container having an open top and a plurality of longitudinal openings formed in its side and end walls, and detachable supporting legs for said container comprising two sets of elongated substantially U-shaped flexible members having a flat intermediate portion for supporting the bottom of said container and arcuate legs extending downwardly in opposite directions from the ends of said portion, said portion having a length substantially equal to the width of said container and terminating in upstanding clamping elements engageable with the side walls of the container, said portion and said upstanding elements defining a socket for clampingly receiving any given part of the bottom of said container.

References Cited in the file of this patent
UNITED STATES PATENTS

| | | |
|---|---|---|
| 1,200,459 | Bode | Oct. 10, 1916 |
| 2,049,645 | Fleckles | Aug. 4, 1936 |
| 2,238,781 | Ritter | Apr. 15, 1941 |
| 2,276,648 | Fuller | Mar. 17, 1942 |
| 2,543,153 | Cowart | Feb. 27, 1951 |
| 2,671,628 | Everhard | Mar. 9, 1954 |